US006821534B2

(12) United States Patent
McDaniel, III et al.

(10) Patent No.: US 6,821,534 B2
(45) Date of Patent: Nov. 23, 2004

(54) METHOD OF DIAGNOSING AND TREATMENT OF A PET WITH FOOD ALLERGIES

(75) Inventors: Lawrence McDaniel, III, Clayton, MO (US); Dorothy P. Laflamme, Millstadt, IL (US); Steven S. Hannah, St. Louis, MO (US); Robert M. Stuckey, Collinsville, IL (US)

(73) Assignee: Nestec S.A., Vevey (CH)

( * ) Notice: Subject to any disclaimer, the term of this patent is extended or adjusted under 35 U.S.C. 154(b) by 265 days.

(21) Appl. No.: 10/161,925

(22) Filed: Jun. 4, 2002

(65) Prior Publication Data

US 2003/0059517 A1 Mar. 27, 2003

Related U.S. Application Data

(62) Division of application No. 09/209,554, filed on Dec. 11, 1998, now Pat. No. 6,403,142.

(51) Int. Cl.[7] .............................. A23K 1/14; A23K 1/18
(52) U.S. Cl. ........................... 426/2; 426/623; 426/630; 426/635; 426/656; 426/657; 426/804; 426/805
(58) Field of Search .......................... 426/2, 623, 630, 426/635, 656, 657, 804, 805

(56) References Cited

U.S. PATENT DOCUMENTS

| | | | |
|---|---|---|---|
| 2,774,670 A | 12/1956 | Albert | |
| 2,827,377 A | 3/1958 | Frost | |
| 3,155,520 A | 11/1964 | Ziffer | |
| 3,365,297 A | 1/1968 | Burgess et al. | |
| 3,821,416 A | 6/1974 | Thompson et al. | ............. 426/2 |
| 3,883,672 A | 5/1975 | Bone et al. | ................. 426/311 |
| 3,984,576 A | 10/1976 | Burkwall, Jr. et al. | ...... 426/104 |
| 4,006,266 A | 2/1977 | Bone et al. | ................. 426/623 |
| 4,015,026 A | 3/1977 | Burkwall, Jr. et al. | ...... 426/582 |
| 4,029,823 A | 6/1977 | Bone et al. | ................. 426/249 |
| 4,044,158 A | 8/1977 | Burkwall, Jr. | .............. 426/271 |
| 4,055,681 A | 10/1977 | Balaz et al. | ................. 426/656 |
| 4,143,169 A | 3/1979 | Skoch et al. | ................. 426/307 |
| 4,239,782 A | 12/1980 | Cinquemani | ................... 426/2 |
| 4,251,556 A | 2/1981 | Burkwall, Jr. et al. | ...... 426/332 |
| 4,293,571 A | 10/1981 | Olofsson et al. | ............... 426/7 |
| 4,297,382 A | 10/1981 | Hosaka | ....................... 426/656 |
| 4,670,268 A | 6/1987 | Mahmoud | .................... 426/72 |
| 4,738,864 A | 4/1988 | Ernster | ........................ 426/641 |
| 4,772,476 A | 9/1988 | Kealy et al. | .................... 426/2 |
| 4,784,860 A | 11/1988 | Christensen et al. | .......... 426/46 |
| 4,857,332 A | 8/1989 | Schricker | .................... 424/442 |
| 4,873,111 A | 10/1989 | Aaltonen et al. | ........... 426/623 |
| 4,879,131 A | 11/1989 | de Rahm | .................... 426/583 |
| 4,910,038 A | 3/1990 | Ducharme | .................. 426/641 |
| 4,911,944 A | 3/1990 | Holub | ......................... 426/635 |
| 4,954,361 A | 9/1990 | Girsh | .......................... 426/580 |
| 4,981,704 A | 1/1991 | Thibault | ....................... 426/41 |
| 5,039,532 A | 8/1991 | Jost et al. | ..................... 426/41 |
| 5,053,235 A | 10/1991 | Alley et al. | ................... 426/74 |
| 5,064,674 A | 11/1991 | Girsh | .......................... 426/580 |
| 5,069,903 A | 12/1991 | Stitt | ......................... 424/195.1 |
| 5,112,812 A | 5/1992 | Samuelsson et al. | ......... 514/21 |
| 5,169,656 A | 12/1992 | Williams et al. | ............... 426/2 |
| 5,186,971 A | 2/1993 | Girsh | .......................... 426/580 |
| 5,204,134 A | 4/1993 | Girsh | .......................... 426/580 |
| 5,219,596 A | 6/1993 | Smith et al. | .................... 426/2 |
| 5,234,750 A | 8/1993 | Akao | |
| 5,260,089 A | 11/1993 | Thornberg | .................. 426/624 |
| 5,290,573 A | 3/1994 | Holub | ............................ 426/2 |
| 5,378,477 A | 1/1995 | Williams et al. | ............... 426/2 |
| 5,431,927 A | 7/1995 | Hand et al. | .................... 426/2 |
| 5,480,660 A | 1/1996 | Ikezawa et al. | ................ 426/2 |
| 5,501,868 A | 3/1996 | Collings et al. | ............ 426/623 |
| 5,525,353 A | 6/1996 | Fajt | ............................ 424/442 |
| 5,552,176 A | 9/1996 | Marino | ....................... 426/641 |
| 5,565,225 A | 10/1996 | Johnston | ........................ 426/2 |
| 5,597,607 A | 1/1997 | Samoto et al. | .............. 426/656 |
| 5,620,737 A | 4/1997 | Kazemzadeh | |
| 5,670,201 A | 9/1997 | Takahashi et al. | .......... 426/648 |
| 5,681,600 A | 10/1997 | Antinone et al. | ............. 426/74 |
| 5,683,739 A | 11/1997 | Lanter et al. | ............... 426/623 |
| 5,690,988 A | 11/1997 | Lin et al. | ..................... 426/635 |
| 5,707,679 A | 1/1998 | Nelson | ........................ 426/635 |
| 5,780,439 A | 7/1998 | Mendy et al. | ................. 514/21 |

OTHER PUBLICATIONS

Protein Technologies International, "Technology and Economics of Nurish Protein for Feeding Veal Calves", Aug. 1991.

Gullford, W. Grant, "What Constitutes a Hypoallergenic Diet?", Proceedings 10th AC VIM Forum, San Diego, CA, May 1992.

Carey, Daniel P., DVM and Reinhart, Gregory, Ph. D, "Treating Allergies with Food", Good Dog, Apr. 1994.

Fadok, Valerie A., "Diagnosing and Managing the Food-Allergic Dog", Cycle Symposium, 1994.

Lalles, J.P., et al, "Influence of Soya Antigen Levels in Milk Replacers on the Disruption of Intestinal Motility Patterns in Calves Sensitive to Soya", Journal of Veterinary Medicine, 1995.

Lalles, J.P. et al, "Hydrolyzed Soy Protein Isolate Sustains High Nutritional Performance in Veal Calves", Journal of Dairy Science, 1995.

Advertising brochure, "For The War Against Dietary Hypersensitivity" from Innovative Veterinary Diets (IVD), a competitor in the business, 1996.

Jeffers, James G., et al, "Responses of Dogs with Food Allergies to Single Ingredient Dietary Provocation", JAVMA, 1996.

Frick, O.L., "Food Allergy in Atopic Dogs", New Horizons in Allergy Immunotherapy, 1996.

(List continued on next page.)

*Primary Examiner*—Arthur L. Corbin
(74) *Attorney, Agent, or Firm*—Bell, Boyd & Lloyd LLC (57) ABSTRACT

A composition comprising partially hydrolyzed proteins for use as a hypoallergenic pet food, and a process for producing it.

20 Claims, 3 Drawing Sheets

OTHER PUBLICATIONS

Hypoallergenic Diet for Dogs, from the University of Georgia Veterinary Hospital, Circa 1996.

Awazuhara, H., et al, "Major allergens in soybean and clinical significance of IgG4 antibodies investigated by IgE–and IgG4–immunoblotting with sera from soybean–sensitive patients", Clinical and Experimental Allergy, 1997.

(Ralston Purina Brochure—Dec.12, 1997).

Hannah, Steven S., Ph.D., "Nutritional Considerations For Food Allergies In Dogs", Ralston Purina Company, Dec. 12, 1997.

"HA–Formula Canine Diet", Ralston Purina Company, Dec. 12, 1997.

"LA–Formula Canine Diet", Ralston Purina Company, Dec. 12, 1997.

"CNM Canine Dermatology Management System", Ralston Purina Company, Dec. 12, 1997.

Nurish 1500 Nutrient Composition from Protein Technologies International, 1998.

Halliwell, Richard E.W., "Hypersensitivity and Diet", 1990's.

METHOD OF DIAGNOSING AND TREATMENT OF A PET WITH FOOD ALLERGIES

CROSS-REFERENCE TO RELATED APPLICATION

This application is a divisional application of U.S. application Ser. No. 09/209,554 filed on Dec. 11, 1998 entitled Hypoallergenic Pet Food now U.S. Pat. No. 6,403,142.

BACKGROUND OF THE INVENTION

1. Field of the Invention

The present invention relates to pet food for domestic pets such as canines including dogs and felines including cats with food allergies and the like.

2. Description of the Related Art

Food allergies, or food hypersensitivities, commonly afflict household pets such as dogs and cats. These allergies can cause the pet to exhibit symptoms such as excessive itching and scratching, diarrhea or other symptoms which are aggravating both to owner and pet. A housebroken dog with diarrhea who is indoors has a major problem. If the owner is around, the dog pesters the owner to get outside. If the owner is not around the owner may later think the dog is exhibiting undesirable behavior and needs to be Punished.

Domestic pets such as dogs and cats give their owners pleasure and often come to be regarded as family members. Accordingly, pet owners also experience distress when their pets develop allergies to their foods. Such food allergies, which are also known as food hypersensitivities, often manifest themselves by itching, swelling, vomiting, diarrhea (and sometimes even broncho-constriction and anaphylaxis), and can be difficult to diagnose. It has been estimated that at least 15% of all dogs in the United States suffer from allergies of some type, and that 10% of those arise from food hypersensitivities.

Diagnosis is a particular problem for veterinarians, because diagnosis of food hypersensitivity is often difficult and consumes an inordinate amount of veterinarians' time. Despite development of sophisticated immunoassay techniques such as radioallergosorbent tests, radioimmunoassay, and enzyme-linked immunoassay, the most reliable way of diagnosing food allergies is still to replace the pet's usual food with another one to which the pet should not be allergic. Traditionally this has been done by feeding the pet a food it has not eaten before, and to which the pet therefore should not have an allergy.

Simply changing from one protein source to another, however, for several reasons provides at best a partial solution to a food hypersensitivity problem. First, the variety of ingredients in commercially available pet foods can make it difficult to find one that includes only food protein the pet has not eaten before. Second, intact proteins are intrinsically antigenic, and owing to cross-reactivities pets could exhibit allergies even to unfamiliar food proteins. Third, inflammatory bowel disorders and other pathological conditions such as gastroenteritis can render the intestinal mucosa permeable to proteins larger than can usually cross the mucosa, and thus these conditions expose gut-associated lymphatic tissue to food proteins large enough to be antigenic. As a consequence, pets suffering from such pathologies often quickly become allergic to the new protein source.

Such reactions to unfamiliar foods can mislead clinicians into concluding incorrectly that the pet's problems do not arise from food hypersensitivity, and thereby delay effective treatment of the problem. In the case of a pet, failure to diagnose the problem can be life threatening because the owner may lose patience with repeated "accidents" by the afflicted pet and decide it is time for a new pet. Thus changing from one antigenic protein source to another often fails to solve either diagnostic or long-term maintenance problems arising from food hypersensitivity.

An alternative approach to changing the identity of the food protein is to reduce its antigenicity through heat denaturation. Heat denaturation often fails, however, because most antigens are heat-resistant. Furthermore, heat denaturation in some cases exposes epitopes hidden in the native form of the proteins, and therefore can increase rather than decrease the antigenicity of the heat-denatured protein.

Dialysis and ultrafiltration have also been used to physically remove antigenic proteins such as beta-lactalbumin from cow's milk for human consumption. Both are expensive procedures, however, that would be cost-prohibitive for pet foods. Hydrolysis of proteins has also been employed to mitigate antigenicity in human nutrition and in farm animal husbandry for calves and pigs. Partially hydrolyzed soy proteins have been used as the basis of a milk substitute, and a modified soy flour for human consumption has been prepared by the action of barley proteases upon conventional soy flour. Similarly, it has been disclosed to prepare a protein hydrolyzate for human consumption by pancreatic hydrolysis of proteins, followed by heat treatment and ultrafiltration. Diets consisting of oligopeptides with four or five amino acid residues have been prepared for treatment of human Crohn's disease patients.

Such protein treatments, however, as noted above have not been attempted in pet foods for domestic dogs and cats. The best solution to diagnosis and treatment of food allergies in pets is to have a food source that is intrinsically hypoallergenic. This invention achieves that.

SUMMARY OF THE INVENTION

Successful treatment of food hypersensitivity ideally involves a food that is intrinsically hypoallergenic, nutritionally-balanced and that when prepared by hydrolysis of food proteins has a molecular weight range that in the target species does not engender diarrhea or other problems and that reduces the likelihood of an allergic response.

The present invention addresses these needs through providing a pet food comprising a proteinaceous component that has undergone sufficient hydrolysis to render it hypoallergenic.

It is thus an object of the present invention to provide a nutritionally-balanced pet food that is hypoallergenic.

It is another object of the present invention to provide a food for diagnosing whether a pet suffers from food hypersensitivity.

It is yet another object of the present invention to provide a food for the long-term maintenance of a pet.

It is further an object of the invention to provide a process for preparing such a hypoallergenic pet food.

It is yet another object of the present invention to provide a commercially practicable process for preparing such a hypoallergenic pet food.

The present invention meets the above objects by providing a pet food comprising as a proteinaceous component proteins hydrolyzed sufficiently as to have minimal effect on the immune system, and thus to be hypoallergenic.

It further meets the above objects by providing a process for preparing such a hypoallergenic pet food by mixing hydrolyzed soy proteins with an edible lipid such as coconut oil to permit extrusion of the pet food from commercially used extruders.

BRIEF DESCRIPTION OF THE DRAWINGS

A better appreciation of the differences in antigenicity and molecular weight of the special formula of the invention may be had by reference to appended drawings, wherein.

Figure 1:
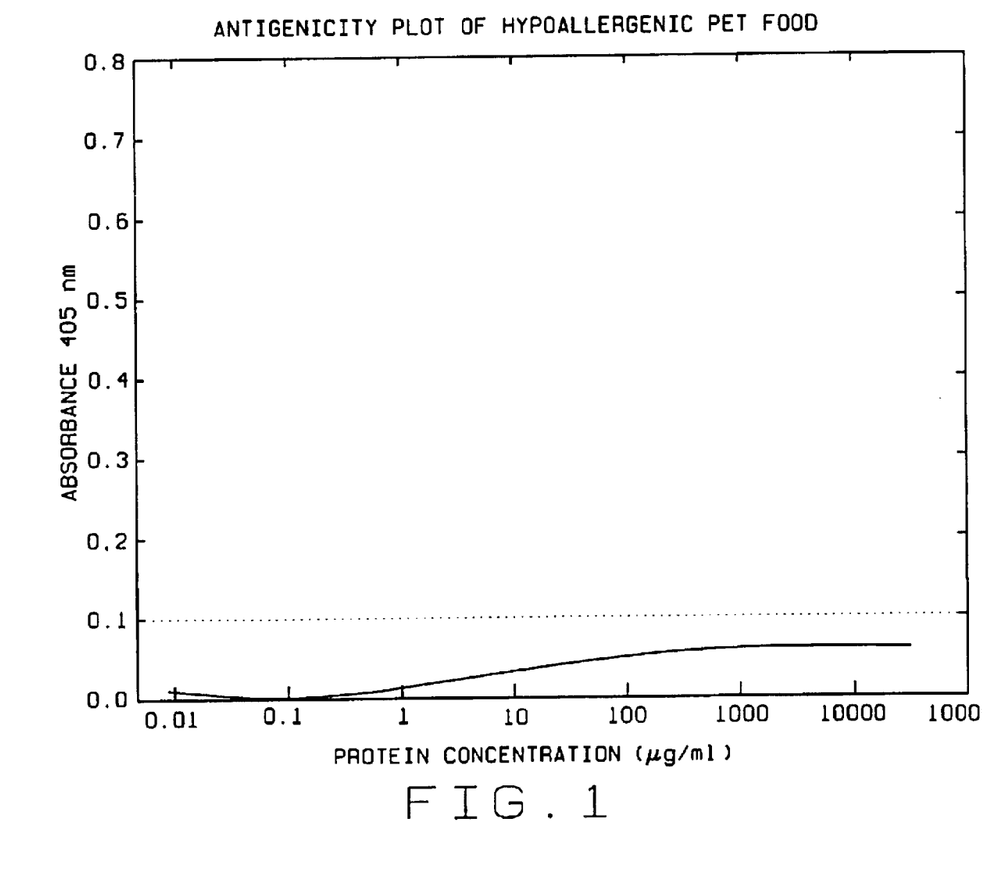
FIG. 1 shows the low level of antigenicity of the hypoallergenic formula.
Figure 2:
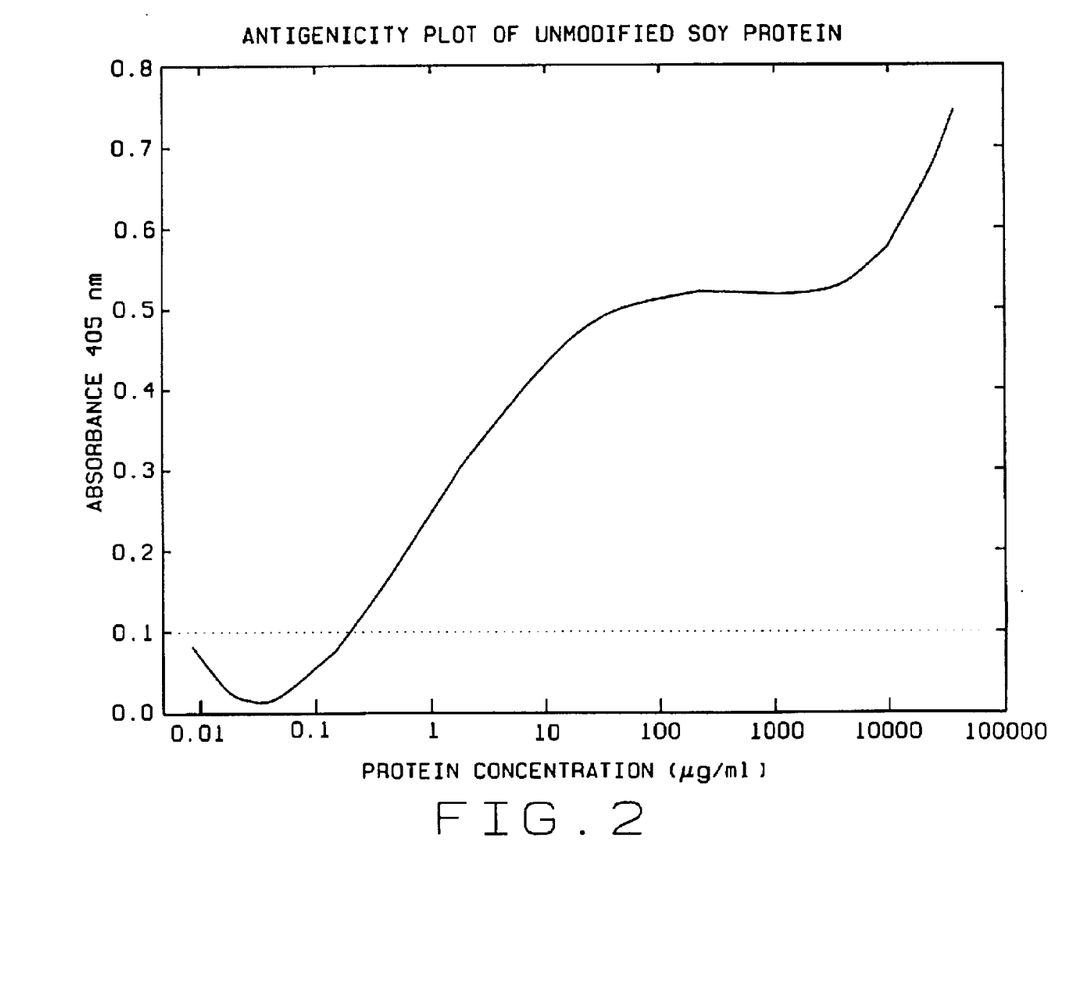
FIG. 2 shows the higher level of antigenicity of unmodified soy protein.
Figure 3:
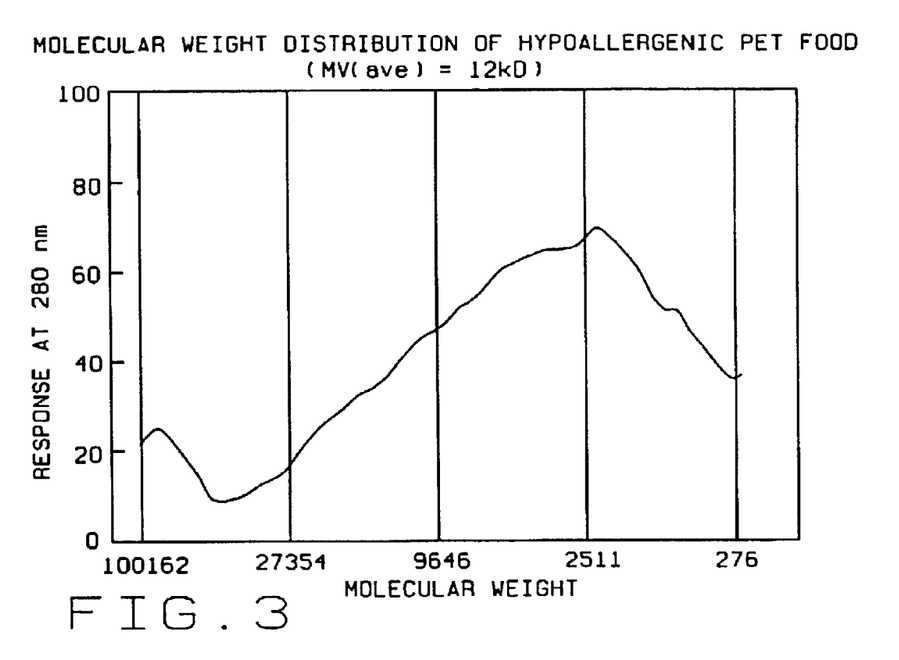
FIG. 3 shows the molecular weight distribution of the hypoallergenic formula.
Figure 4:
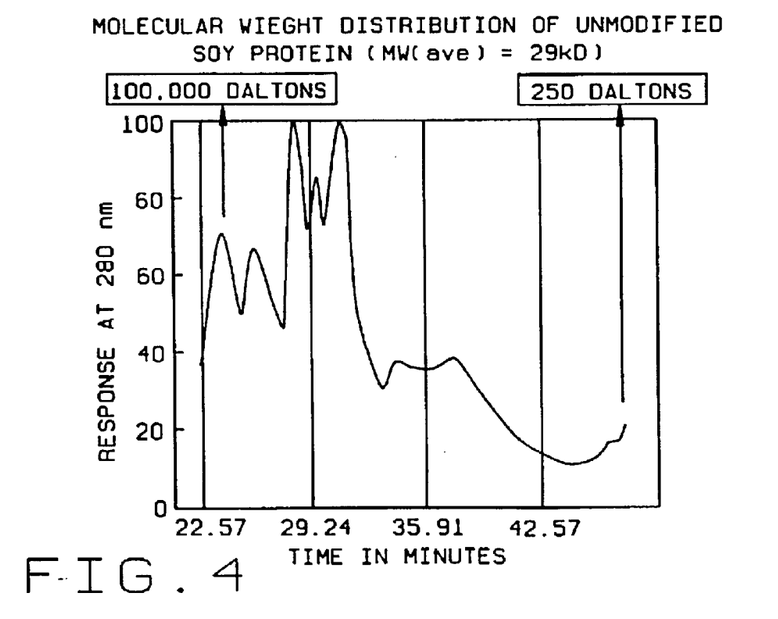
FIG. 4 shows the molecular weight distribution of unmodified soy protein.

It is to be noted, however, that the appended drawings illustrate only comparative antigenicity plots and molecular weight distributions for the purposes of contrasting the pet food formula of the invention from conventional pet food formulas and that they are therefore not to be considered limiting of the scope of the invention, for the invention may admit to other formulas with other plots and distributions.

DETAILED DESCRIPTION OF THE INVENTION

Definitions

"Agglomerating agent" as used herein refers to a composition used to effect agglomeration of fine powders.

"Allergy" as used herein refers to altered bodily reactivity to a substance in response to an earlier exposure.

"Allergen" as used herein is a substance that induces an allergy.

"Antigen" as used herein refers to a substance capable of eliciting an immune response in a pet.

"Food hypersensitivity" as used herein is an allergy or other immunemediated adverse reaction to a food fed to a pet.

"Basal mix" as used herein refers to the mixture of nutritional components that is extruded to produce a pet food.

"Dalton" as used herein conforms to common scientific usage to refer to a single gram atomic weight; thus a kiloDalton, abbreviated kD, is a kilogram atomic weight.

"Hypoallergenic" as used herein refers to a composition that when fed to a pet at customary levels that provide adequate nutrition over the pet's life does not produce a clinically discernible allergic reaction.

"Lipid" as used herein refers to a chemical compound that is substantially soluble in a non-polar organic solvent such as chloroform, and that includes fats and oils as lipids that are substantially solid and liquid, respectively, at room temperature. "Edible lipids" are those that can be eaten in normal dietary quantities without ill effects.

"Pet" refers to a domestic companion animal, and particularly to a dog or cat.

"Proteinaceous component" as used herein refers to that portion of a mixture that contains protein or protein fragments.

"Weight average molecular weight" as used herein conforms to common scientific usage in referring to an average molecular weight calculated as the mass-weighted average of the molecular weights of the components of a mixture.

We have noted that allergies typically result from adverse reactions to proteins, and especially to glycoproteins, that the immune system recognizes as foreign. Food proteins, although foreign, usually do not cause allergies because the intestinal mucosa only absorbs proteins after they have been extensively hydrolyzed and thereby rendered non-antigenic in the gut. Pathological conditions such as inflammatory bowel disease damage the intestinal mucosa and thereby increase its permeability to the higher molecular weight, and therefore antigenic, proteins. Exposure of the gut-associated lymphatic tissue to these antigenic proteins during inflammatory bowel disease is one mechanism that results in food allergies.

Because of the exquisite sensitivity of the immune system to allergens, we take the approach that it is best to expose the pet to as few protein sources as possible to avoid the risk of inadvertently exposing the pet to adventitious allergens. Thus a hypoallergenic food is ideally self-contained and nutritionally-balanced, and as such must contain a proteinaceous component. We have concluded that to provoke an immune response a potential allergen has to be of sufficient size to be recognized as foreign by the immune system. Typical food allergens have molecular weights in the range of 10–70 kD, and they are thus large enough to provoke an immune response while still small enough to cross the gut membrane. Pet foods in use heretofore for diagnosis and treatment of food hypersensitivity have average molecular weights around 22 kD, thus making them still in the antigenic range.

In preparing a hypoallergenic pet food the proteinaceous component therefore cannot be too large in average size, but it also cannot be too small. A proteinaceous component having too low an average molecular weight would consist largely or entirely of highly charged species. This is because many amino acid residues in an intact protein bear no charge, but complete hydrolysis renders each residue zwitterionic at physiological pH. A zwitterion comprises both an anionic and cationic moiety in the same molecule (the primary amino and carboxylate groups, respectively, in this case), in addition to any charges originally existing on the side chains. Hydrolysis therefore creates two new charges at each amino acid cleaved from a protein. Simple amino acids, because of their high charge, have a strongly bitter taste that is notoriously unpalatable. Furthermore, ingesting a highly charged species would lead to a high osmotic strength in the intestinal tract, which would draw water to the gut and thereby provoke diarrhea. Any owner of an indoor pet knows you do not want that.

Completely hydrolyzed proteins are undesirable for other reasons. It is not normal for an adult mammal to acquire nutrition from completely hydrolyzed proteins, particularly as a maintenance diet. The adult mammal's digestive tract is accustomed to digesting proteins, not having them supplied already fully digested. In the absence of food proteins to hydrolyze, the pancreatic enzymes secreted into the food slurry in the intestine might attack the intestinal wall. Lack of proteins to digest raises concerns about interfering with the normal functioning of gastric hormones that provide physiological feedback to the digestion process. This particularly troubling because the effect of protein absence on gastrointestinal motor function is not known. Thus it is desirable to supply nutrition in a diet as close to normal food as is possible without triggering an allergic reaction.

Other considerations also make partial hydrolysis especially desirable. Hydrolysis of proteins is expensive, and hence hydrolyzing the proteins more than is necessary to mitigate allergic reactions is cost-prohibitive for a pet food.

In addition, simple amino acids tend to be hygroscopic, that is to absorb water from the air. For commercial purposes it is especially valuable to be able to distribute the pet food without burdensome precautions to protect it from atmospheric moisture.

For all these reasons it is therefore desirable to afford a proteinaceous component with an average molecular weight as high as is possible without provoking an allergic response in the target species.

Although food allergens can have molecular weights as low as 10 kD, we have now found that, in dogs, hydrolyzed soy proteins with an average molecular weight below 18 kD are sufficiently hypoallergenic to be useful in the diagnosis and treatment of food allergies. Thus one embodiment of the present invention includes soy proteins with an average molecular weight below 18 kD. A preferred embodiment of the present invention includes soy proteins with an average molecular weight of around 12 kD, and with less than 20% of the proteinaceous component on a weight basis having a molecular weight greater than 20 kD. We have also found that in a preferred embodiment for cats the hypoallergenic pet food comprises partially hydrolyzed meat-based proteins in the proteinaceous component to increase the acceptance of the pet food by cats.

We have found that to be commercially valuable as a kibble a hypoallergenic pet food should be capable of processing with extruders and other equipment already in place. We have found that a basal mixture of partially hydrolyzed soy proteins and corn starch has rheological properties that make it impracticably difficult to process through extruders now in commercial production use. Corn starch also tends to form explosive aerosols when handled. We have found that agglomerating the basal mixture with an agglomerating agent such as coconut oil not only reduces the explosion hazard, but also modifies the rheological properties of the basal mixture to make it compatible with extrusion through the extruders now in use, and thus to be commercially valuable. Simply mixing in the coconut oil into the basal mixture does not produce this benefit. In a preferred embodiment the basal mixture is agglomerated with coconut oil by atomization, and added to the extent of less than about 5% by weight. In an especially preferred embodiment, coconut oil is atomized onto the basal mixture to the extent of about 1–2% by weight. In a still more preferred embodiment, a second application of coconut oils is made before the basal mixture proceeds to the extruder.

Having prepared a product, a commercial producer needs to be able to distribute it in a marketable form. We have found that a pet food prepared as described above can become rancid. We have further found that if rancidity is a problem its onset can be impeded by packaging the pet food in packaging material that has been impregnated with an anti-oxidant. In an especially preferred embodiment, the container is impregnated with vitamin E, but a variety of widely used anti-oxidants can be employed, such as butylated hydroxy toluene (BHT: 2,6-di-tert-butyl-4-methylphenol), butylated hydroxy anisole (BHA: a mixture of 2- and 3-tert-butyl-4-methoxyphenol), 4,4-methylene-bis-2,6-di-tert-butylphenol, 2,4-dimethyl-6-tert-butyl phenol, 2,6-di-tert-butylphenol, ethoxy-quin,tetrakis-methylene-(3,5-di-tert-butyl-4-hydroxyhydrocinnamate) methane, tert-butylhydroquinone, and other anti-oxidants well-known in the art to be effective for protection of oxidizable foodstuffs against oxidation. In an especially preferred embodiment, about 150 ppm of vitamin E is impregnated in a fourply bag comprising about 60% high density polyethylene and about 40% polyethylene.

The hypoallergenic pet food can also be distributed in other forms besides a kibble. Other useful forms include without limitation a liquid, a gruel, and a powder from which a liquid or a gruel can be prepared. These other useful forms do not require extrusion, and thus do not require agglomeration with an agglomerating agent. Edible lipids will still be necessary for nutritional purposes, however.

It is apparent that a variety of protein sources other than soy could be partially hydrolyzed and used as the proteinaceous component of the pet food. Other protein sources could be derived from animal or plant sources. Animal sources of protein comprise mammals and their milk, fowl, amphibians, reptiles, and fish, and include cattle, sheep, pigs, goats, deer, rabbits, horses, kangaroos, catfish, herring, salmon, alligators, iguanas, quail and their eggs, ostriches and their eggs, turkeys and their eggs, chickens and their eggs, and ducks and their eggs.

Plant sources of protein comprise both unicellular and multicellular organisms, and besides soy beans include algae, yeasts, bacteria, flax seed, corn, wheat, oats, sorghum, kelp, barley, alfalfa, rye, quinoa, peanuts, rice, and potatoes.

It is also apparent that a variety of other agglomerating agents could be used to modify the rheological properties of the pet food basal mix such that it can be extruded through conventional extruders. Although coconut oil is preferred, any pet food-compatible agglomerating agent may be used. Besides coconut oil, other agglomerating agents found to be suitable for this purpose include canola oil, but other edible fats and oils could also be used. Examples of such fats and oils include without limitation almond oil, apricot oil, avocado oil, borage oil, black oil, canola oil, carrot oil, coconut oil, corn oil, crambe oil, currant oil, flax oil, filbert seed oil, grapeseed oil, ground nut oil, hazel nut oil, hop oil, kiwi seed oil, kukui nut oil, macadamia nut oil, mango seed oil, marigold oil, mustard seed oil, neem oil, olive oil, palm oil, passionflower seed oil, peanut oil, pine nut oil, rapeseed oil, rice bran oil, safflower seed oil, sesame seed oil, soybean oil, sunflower oil, sweet almond oil, tea seed oil, walnut oil, wheat germ oil, and yucca oil. Animal, fish, and poultry fats can also be used, provided they have been purified to remove any proteinaceous content that might be antigenic.

Besides atomization, other ways of applying agglomerating agent to the basal mixture include spraying, sonication, or other ways of adding finely dispersed agglomerating agents such as edible lipids.

Accordingly, it is also apparent from the foregoing that the present invention is not limited to the embodiments shown. Other equally effective embodiments are contemplated and within the scope of the present invention.

EXAMPLES

Preparation of the hypoallergenic pet food. A basal mixture was prepared by mixing together the following ingredients, where PF stands for Pet Food grade:

| Ingredient | Amount |
|---|---|
| magnesium oxide PF | 1.86 lbs |
| corn starch PF | 670.63 lbs |
| vitamins super premium | 0.54 lbs |
| vitamin E PF (50% by wt. dl-alpha-tocopherol acetate, supplying 500 IU/gm) | 0.12 lbs |
| Calcium carbonate PF | 19.60 lbs |
| Hypo AL Mineral PX J20 | 262.49 lbs |

-continued

| | |
|---|---|
| Dicalcium phosphate 70% human grade PF | 12.79 lbs |
| Sodium chloride PF | 1.12 lbs |
| Choline chloride 70 PF | 2.45 lbs |

The vitamin super premium component contains riboflavin (18.47%), ground yellow corn (14.33%), vitamin E (18.02%), biotin (3.7%), vitamin $B_{12}$ (3.255%), calcium pantothenate (14.5%), vitamin $D_3$ (0.55%), folic acid (1.85%), menadione sodium bisulfate complex (0.4%), niacin (14.72%), pyridoxine hydrochloride (1.50%), thiamine hydrochloride (2.69%).

The Hypo AL Mineral PX J20 component above contains cellulose (21.30 lbs), a blend of the food gums guar and gum arabic (5.33 lbs), trace minerals (6.81 lbs) including selenium, dl-methionine (2.40 lbs), zinc sulfate (0.04 lbs), isolated partially hydrolyzed soy protein granules PF (225.43 lbs), and lecithin (feed grade PF; 1.14 lbs). The basal mixture described in the above table was then agglomerated with coconut oil (17.76 lbs) containing a trace of citric acid to facilitate subsequent processing, extruded through an extruder, and sprayed with canola oil containing tert-butylhydroquinone as an anti-oxidant.

Molecular weight determinations. Dry samples as well as standards were dissolved in 6 M guanidine hydrochloride (GuHCl)-pH 7.6 phosphate buffer containing 1 mM ethylenediamine tetraacetic acid (EDTA) and 10 mM dithiothreitol (DTT). The samples were heated at 65° C. for 3 hours to ensure the complete dissolution of all proteins in a totally unfolded, random coil state. Under these conditions elution time (volume) correlates with molecular weight.

Gel permeation size exclusion chromatography was performed on a Hewlett Packard 1050 chromatography system with a Progel (TSKG3OOOSWXL) column (resolution 100,000 to 200 daltons for random coil peptides) connected in series with a GPC-Peptide column (resolution from 10,000 to 250 daltons). The columns are purchased from Supelco (Bellefonte, Pa.). The columns were eluted with the GuHCl buffer at a flow rate of 0.47 mL/min, and the eluted proteins detected by absorbance at 280 nm.

The column was calibrated with bovine serum albumin (66 kD), ovalbumin (44 kD), alpha-chymotripsinogen (25.7 kD), myoglobin (17 kD), cyto-chrome c (12.4 kD) and a synthetic hexapeptide (685 daltons). The elution times of the standards were fitted to the molecular weights by a cubic equation. The molecular weight averages were calculated by integration from the high limit (100 kD) to the low limit (250 daltons).

The average molecular weights were defined as: weight average molecular weight=$MW_f = \Sigma_i n_i M^2_i / \Sigma_i n_i M_i$, and number average molecular weight=$MW_n = \Sigma_i n_i M_i / \Sigma_i n_i$, where $n_i$=number of molecules with molecular weight $M_i$, and $M_i$=molecular weight of the $i^{th}$ molecule. The polydispersity is the weight average molecular weight divided by the number average molecular weight. A low polydispersity indicates narrow molecular weight distribution.

Antigenicity measurements were performed by the method described in Methods of Enzymology, Vol. 118, pp. 742–766.

Sample Preparation. Antigenicity was measured on the soluble portion of the sample. For low antigenicity samples, such as those containing only hydrolyzed soy protein, the extraction concentration was 15 grams of sample per 100 mL of buffer. High antigenicity samples, such as those of native soy protein, are too viscous at this concentration, and were extracted at concentrations of 5 grams of sample per 100 mL of buffer.

To the appropriate amount of sample as defined above was added 100 mL carbonate buffer to a 250 mL beaker. Sample was slowly added to the vortex of carbonate buffer stirring on a magnetic stirrer, and the slurry was stirred until the sample was completely dispersed (approximately 5 minutes). The pH was then adjusted to pH 9.6 with 6 M NaOH, if necessary, and the dispersion was stirred for 30 minutes. The pH was then readjusted to 9.6, if necessary. The slurry was stirred on a magnetic stirrer for 1 h, and then passed through a portable homogenizer twice before being centrifuged at 12,000×G for 30 minutes at 25–30° C. The supernatant was then decanted and placed in a covered container. Protein content of the supernatant was then measured by the modified Kjeldahl method, as described below.

Protein determination by the modified Kjeldahl method (Official Methods of Analysis of the AOAC (Association of Official Analytical Chemists), 16th Edition, (1995); 988.05, Locator #4.2.03; 920.87, Locator 32.1.22; and 991.20, Locator # 33.2.11):

One gram of sample was weighed accurately and transferred into an 800 mL Kjeldahl flask. Pope Kjeldahl powder (19.8 g) was added to the sample in the flask, followed by approximately 30 mL of concentrated $H_2SO_4$. The sample mixture was digested for approximately one hour, or for about 30 minutes longer than the time necessary for the sample solution to clear. The flask was allowed to cool to under 100° C. (estimated) or until precipitate started to form, whichever occurred first. The sample solution was diluted to approximately 400 mL with water, by forcefully adding the water directly into the acid in the flask to ensure thorough mixing. A known volume of 0.2000 N $H_2SO_4$ was placed into a wide mouth 500 mL Erlenmeyer flask, followed by five to seven drops of Methyl Red indicator, and the acid solution diluted to approximately 100 mL with deionized water. The wide mouth Erlenmeyer flask containing the standard acid was placed under the condenser of a distillation unit, with the tip of the condenser submerged in the standard acid.

Approximately 75 mL of 10 N NaOH was added down the neck of the Kjeldahl flask without agitation, and the flask immediately connected to the condenser. Once connected, the Kjeldahl flask was swirled to mix thoroughly the solution, and the sample solution distilled until approximately 200 mL of distillate collected in the Erlenmeyer flask containing the standard acid.

The tip of the condenser tube was rinsed into the Erlenmeyer flask containing the standard acid with deionized water. The Erlenmeyer flask was then removed and the distillate titrated to a Methyl Red end point.

Percent nitrogen was calculated as [{(vol. std. acid)×(0.2)×(conc. acid)−(vol. std. base)×(conc. base)−(vol. blank)×(conc. base)}×(0.014007)×(100)]/[(sample weight in grams)], where 0.014007=grams per milliequivalent of nitrogen.

Percent nitrogen or percent protein in each sample was calculated as:

% $N$=[(vol. std. acid−vol. std. base−vol. blank)×(2)×(0.0014007)×(100)]/[sample weight, $g$], and % protein=% $N$×6.25, where 6.25 is the protein factor.

Sample antigenicity was then determined in a dust-free environment on a series of sample dilutions, with one positive sample and one negative sample included in each day's testing. A series of 23 halving dilutions of the sample and the positive reference extract were prepared, and equal volumes of the sample to be tested and carbonate buffer were stirred by a vortex mixer in culture tubes. For each dilution 100 microliters were pipetted into each of three wells, with 11 wells per plate left blank of sample and 100 microliters of carbonate buffer added to them instead. The plate was then covered with a lid and placed in a sealed box, where it was allowed to equilibrate for 16–24 hours at 40° C. Any excess sample was then removed by overturning plate and tapping it quickly on a paper towel, after which the plate was washed three times with phosphate buffer from a wash bottle, with each washing consisting of filling the well to volume with buffer. Excess buffer was then removed by overturning the plate and tapping it quickly on a paper towel. The wells were then filled to volume, with care being taken not to allow the buffer to overflow into surrounding wells on the plate. After the final wash, the plate was overturned and rapped sharply on clean, dry paper towel.

One microliter of 3.0% rabbit serum was added to each well, and the plate then covered and allowed to incubate for 30 minutes at 37° C. Excess rabbit serum was then removed by aspiration and the plate washed three times with phosphate buffer as described above. The conjugate was then diluted as above and 100 microliters of diluted conjugate added to each well.

After being covered and equilibrated for 1 hour at 37° C. the excess conjugate was removed and washed three times with phosphate buffer as above. The substrate was prepared as outlined above and 100 microliters of prepared substrate added to each well. The plate was covered and the reaction allowed to proceed for 20 minutes at room temperature (approximately 21° C.), in the dark. After 20 minutes, the reaction was quenched by addition of 100 microliters of 1 M phosphoric acid to each well, and the plate was read immediately at 405 nm.

Antigenicity is reported as positive or negative, with the antigenicity value determined as follows. From the average of the three absorbance values for each sample dilution was subtracted the average blank absorbance value. If all average absorbance data points fell below 0.100 after the average blank value was subtracted, the sample is reported as negative. If any of the average sample points were 0.100 or greater after the average blank value was subtracted, the sample is reported as positive. Average blank absorbance must be below 0.200 for the results of the assay to be valid.

Test on dogs. Six dogs with inflammatory bowel disease were selected from patients presented to the Veterinary Teaching Hospital at the University of California Davis between July and December, 1997. Criteria for entry into the study included a diagnosis of chronic inflammatory bowel disease based on history, physical examination, fecal flotation, fecal smear, and histological evidence of inflammation as well as willingness to comply with the guidelines of the study. Serum $B_{12}$, folate, and trypsin-like immunoreactivity were also measured at the beginning of the study.

Gastroduodenoscopy and biopsy were performed prior to and after 8 to 14 weeks of dietary therapy. All owners completed a questionnaire every two weeks during the 10 week study. The questionnaire entailed determination of the dogs' appetite, body weight, coat condition, frequency of defecation, and stool quality. Stool quality was assessed according to a score of 0 to 100 with 0 being very watery stool and 100 being very firm stool. Illustrated guidelines were provided to the clients to aid consistency in scoring Initial therapy for all dogs was restricted to the feeding of the test diet. All dogs were fed the test diet twice daily, with total intake calculated to meet energy requirements ($132*$(body weight)$_{kg}^{0.75}$). No other medical therapy was used in the initial management of the dogs, and considerable emphasis was placed on "educating" owners on the importance of feeding only the diet with absolutely no treats. Patients not showing adequate improvement in clinical signs after 2 to 4 weeks on diet alone had appropriate medical therapy added to the dietary regime.

Intestinal biopsies were examined in a blinded fashion by a single pathologist using a numeric grading scheme. In this scheme points were assigned to each of the following changes in the specimens: one point each for villus blunting, villus fusion, minimal to mild inflammation within the lamina propria and/or submucosa, mild infiltration of lymphocytes into the mucosal epithelium, erosion or necrosis, lymphangiectasia of the lacteals, fibrosis, crypt or gland ectasia; two points each for moderate inflammation within the lamina propria and/or submucosa, or moderate infiltration of lymphocytes into the mucosal epithelium; three points each for severe infiltration of the lamina propria and/or submucosa, or severe infiltration of lymphocytes into the mucosal epithelium. The degree of inflammation was based on the relative percentage of inflammation (above a subjective determination of resident lymphoplasmacytic populations to the combined amount of connective tissue and smooth muscle in the lamina propria. Inflammation was categorized as: mild if the sample contained less than 40% inflammatory' cells, moderate if the sampled contained 40 to 60% inflammatory cells, and severe if the sample contained over 60% inflammatory cells. Grading was based on the total score of abnormal findings in each section. Mild pathology was defined as a total score less than 2; a score between 3 and 6 was defined as moderate pathology; and severe pathology was defined as a score greater than 7.

Data were analyzed for normality of distribution and the treatment effect was analyzed by paired t-tests, using Sigmastat (SigmaStat 2.0, Jandel Scientific, San Rafael Calif.). Test criteria were set at $\alpha=0.050$, $\beta=0.750$.

Six different breeds were evaluated with a mean age of 3.3±1.2 years. The duration of vomiting or diarrhea ranged from 3 to 18 months. Five dogs had been previously refractory to a variety of commercial and home-cooked elimination diets, and three dogs (subjects 1, 2 and 6) had failed to respond to concurrent medical therapy with metronidazole, metoclopramide, famotidine, amoxicillin, or diphenhydramine.

Fecal scores, based upon a standardized subjective comparison, improved significantly, from a mean of 42.5 before therapy to 91.7 after therapy. Dietary therapy alone provided adequate clinical improvement in four dogs. Additional medical therapy was required in two patients. A dog with inflammatory bowel disease and concurrent exocrine pancreatic insufficiency required pancreatic enzyme replacement, and metronidazole before its stools improved. A patient that presented with vomiting associated with lymphoplasma-cytic gastritis showed a moderate reduction in the frequency of vomiting episodes following dietary intervention alone, and complete resolution of vomiting following dietary therapy and metoclopramide. Four dogs showed histologic improvement in their gastric biopsies, although the overall effect of treatment did not reach statistical significance. Significant histologic improvement occurred in duodenal biopsies following therapy.

TABLE 1

Summary of signalment and response to dietary therapy in dogs with chronic inflammatory bowel disease

| Subject | Signalment | History | BCS (9 pt) | Clinical outcome | Additional therapy | Chg BW (kg) |
|---|---|---|---|---|---|---|
| 1 | 2.5 yr M Coonhound | 6 mo history vomiting and diarrhea (lg and sm bowel), wt loss (6 kg) | 3 | Complete resolution | None | +6.6 |
| 2 | 9 y F Collie | 3 mo history vomiting & diarrhea (sm bowel), wt loss (3 kg) | 6 | Complete resolution | None | +6.5 |
| 3 | 2 yr FS Puli | 18 mo history of intermittent vomiting | 4 | Moderate improvement | Metoclopramide | −0.7 |
| 4 | 1.5 yr FS Rhod. Ridge | 18 mo history vomiting & diarrhea (lg & sm bowel), wt loss (4 kg) | 3 | Complete resolution | None | 0 |
| 5 | 3 Yr F German Shepherd | 3 mo history diarrhea (sm bowel), wt loss (5 kg). Concurrent EPI | 3 | Moderate improvement | Pancreazyme, Prednisone, Metronidazole | 0 |
| 6 | 1.5 yr MC Dalmation | 6 mo history vomiting & diarrhea (lg bowel) | 7 | Moderate improvement | None | 0 |

BW = body weight;
BCS = body condition score, as defined in D. P. Laflamme, "Body Condition Scoring and Weight Maintenance," Proc. N. Am. Vet. Conf. Jan. 16–21, 1993, Orlando, FL, pp 290–291; D. P. Laflamme, R. D. Kealy, and D. A. Schmidt, "Estimation of Body Fat by Body Condition Score," J. Vet. Int. Med. 1994 8:154; D. P. Laflamme, G. Kuhlman, D. F. Lawler, R. D. Kealy, and D. A. Schmidt, "Obesity Management in Dogs," J. Vet. Clin. Nutr. 1994 1:59–65;
EPI = exocrine pancreatic insufficiency;
M = male;
F = female;
FS = female (spayed);
MC = male, castrated.

The above examples are provided by way of illustrating the invention, and not to serve as limitations to it.

What is claimed is:

1. A method for diagnosing or treating a pet with food hypersensitivity, comprising the step of feeding the pet a solid hypoallergenic pet food providing a maintenance diet for said pet, said food comprising a basal mix including a proteinaceous component comprising proteins that have been hydrolyzed under conditions such that said component has an average molecular weight below 18 kD, and at least a portion of said component, but not more than about 20 percent by weight, has a molecular weight above 20 kD.

2. The method of claim 1, wherein the protein component has been hydrolyzed by a method selected from the group consisting of acidic hydrolysis, alkaline hydrolysis and enzymatic hydrolsis.

3. The method of claim 1 wherein the protein component is chosen from the group consisting of plant sources and animal sources.

4. The method of claim 3 wherein the plant source is chosen from the group consisting of soy beans, algae, yeast, bacteria, flaxseed, corn, wheat, oats, sorghum, barley, alfalfa, rye, quinoa, peanuts, rice, and potatoes.

5. The method of claim 3, wherein the animal source is chosen from the group consisting of mammals and their milk, fowl and fish.

6. The method of claim 5 wherein the pet food is in a form chosen from the group consisting of a kibble and a powder from which a gruel can be prepared.

7. The method of claim 1 which is diagnostic for food hypersensitivity.

8. The method of claim 7 wherein the symptom of food hypersensitivity is exhibited by diarrhea in said pet.

9. The method of claim 7 wherein the symptom of food hypersensitivity is exhibited by itching skin in said pet.

10. The method of claim 7 wherein the symptom of food hypersensitivity is exhibited by swelling in said pet.

11. The method of claim 7 wherein the symptom of food hypersensitivity is exhibited by vomiting in said pet.

12. The method of claim 7 wherein the symptom of food hypersensitivity is exhibited by bronco-constriction in said pet.

13. The method of claim 7 wherein the symptom of food hypersensitivity is exhibited by anaphylaxis in said pet.

14. The method of claim 7 wherein the symptom of food hypersensitivity is exhibited by inflammatory bowel disease in said pet.

15. The method of inhibiting the occurrence of food hypersensitivity in a pet, the method comprising the step of orally administering to the pet a solid hypoallergenic pet food composition comprising a basal mix that provides a maintenance diet and includes a proteinaceous component comprising proteins that have been hydrolyzed under conditions such that said component has an average molecular weight below 18 kD, and at least a portion of said component, but not more than about 20 percent by weight, has a molecular weight above 20 kD.

16. The method of claim 15, wherein the protein component has been hydrolyzed by a method selected from the group consisting of acidic hydrolysis, alkaline hydrolysis and enzymatic hydrolysis.

17. The method of claim 15 wherein the protein component is chosen from the group consisting of plant sources and animal sources.

18. The method of claim 15 wherein the plant source is chosen from the group consisting of soy beans, algae, yeast, bacteria, flaxseed, corn, wheat, oats, sorghum, barley, alfalfa, rye, quinoa, peanuts, rice, and potatoes.

19. The method of claim 15, wherein the animal source is chosen is chosen from the group consisting of mammals and their milk, fowl and fish.

20. The method of claim 15, wherein the pet food is in a form chosen from the group consisting of a kibble and a powder from which a gruel can be prepared.

* * * * *